United States Patent
Chen et al.

(10) Patent No.: US 8,447,960 B2
(45) Date of Patent: May 21, 2013

(54) PAUSING AND ACTIVATING THREAD STATE UPON PIN ASSERTION BY EXTERNAL LOGIC MONITORING POLLING LOOP EXIT TIME CONDITION

(75) Inventors: Dong Chen, Yorktown Heights, NY (US); Mark Giampapa, Yorktown Heights, NY (US); Philip Heidelberger, Yorktown Heights, NY (US); Martin Ohmacht, Yorktown Heights, NY (US); David L. Satterfield, Tewksbury, MA (US); Burkhard Steinmacher-Burow, Boeblingen (DE); Krishnan Sugavanam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 12/684,860

(22) Filed: Jan. 8, 2010

(65) Prior Publication Data

US 2011/0173422 A1 Jul. 14, 2011

(51) Int. Cl.
*G06F 9/48* (2006.01)
(52) U.S. Cl.
USPC .......................................... 712/229; 712/39
(58) Field of Classification Search
None
See application file for complete search history.

(56) References Cited

U.S. PATENT DOCUMENTS

| | | | | |
|---|---|---|---|---|
| 7,613,909 B2* | 11/2009 | May et al. | | 712/225 |
| 7,676,660 B2* | 3/2010 | Kissell | | 712/220 |
| 7,853,950 B2* | 12/2010 | Lewis | | 718/102 |
| 2008/0034190 A1 | 2/2008 | Rodgers et al. | | |
| 2008/0229311 A1* | 9/2008 | May | | 718/102 |
| 2010/0269115 A1* | 10/2010 | Arimilli et al. | | 718/103 |
| 2011/0173420 A1* | 7/2011 | Chen et al. | | 712/220 |

OTHER PUBLICATIONS

U.S. Official Action dated Oct. 15, 2012 from related application U.S. Appl. No. 12/684,852.

* cited by examiner

*Primary Examiner* — Kenneth Kim
(74) *Attorney, Agent, or Firm* — Scully, Scott, Murphy & Presser, P.C.; Daniel P. Morris, Esq.

(57) ABSTRACT

A system and method for enhancing performance of a computer which includes a computer system including a data storage device. The computer system includes a program stored in the data storage device and steps of the program are executed by a processor. The processor processes instructions from the program. A wait state in the processor waits for receiving specified data. A thread in the processor has a pause state wherein the processor waits for specified data. A pin in the processor initiates a return to an active state from the pause state for the thread. A logic circuit is external to the processor, and the logic circuit is configured to detect a specified condition. The pin initiates a return to the active state of the thread when the specified condition is detected using the logic circuit.

13 Claims, 3 Drawing Sheets

PAUSING AND ACTIVATING THREAD STATE UPON PIN ASSERTION BY EXTERNAL LOGIC MONITORING POLLING LOOP EXIT TIME CONDITION

STATEMENT REGARDING FEDERALLY SPONSORED RESEARCH OF DEVELOPMENT

This invention was made with Government support under Contract No.: B554331 awarded by the Department of Energy. The Government has certain rights in this invention.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010, for "HARDWARE SUPPORT FOR COLLECTING PERFORMANCE COUNTERS DIRECTLY TO MEMORY"; U.S. patent application Ser. No. 12/684,190, filed Jan. 8, 2010, for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010, for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, filed on Feb. 1, 2010, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 61/261,269, filed Nov. 13, 2009, for "LOCAL ROLLBACK FOR FAULT-TOLERANCE IN PARALLEL COMPUTING SYSTEMS"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed. Jan. 8, 2010, for "ZONE ROUTING IN A TORUS NETWORK"; U.S. patent application Ser. No. 12/684,182 filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 13/008,602, filed Jan. 18, 2011, for "CACHE DIRECTORY LOOKUP READER SET ENCODING FOR PARTIAL CACHE LINE SPECULATION SUPPORT"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "SUPPORT FOR NON-LOCKING PARALLEL RECEPTION OF PACKETS BELONGING TO A SINGLE MEMORY RECEPTION FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No 13/004,007, filed Jan. 10, 2011, for "MULTI-PETASCALE HIGHLY EFFICIENT PARALLEL SUPERCOMPUTER"; U.S. patent application Ser. No. 12/984,252, filed Jan. 4, 2011, for "CACHE WITHIN A CACHE"; U.S. patent application Ser. No. 13/008,502, filed Jan. 18, 2011, for "MULTIPROCESSOR SYSTEM WITH MULTIPLE CONCURRENT MODES OF EXECUTION"; U.S. patent application Ser. No. 13/008,583, filed Jan. 18, 2011, for "READER SET ENCODING FOR DIRECTORY OF SHARED CACHE MEMORY IN MULTIPROCESSOR SYSTEM"; U.S. patent application Ser. No. 12/984,308 filed on Jan. 4, 2011, for "EVICT ON WRITE, A MANAGEMENT STRATEGY FOR A PREFETCH UNIT AND/OR FIRST LEVEL CACHE IN A MULTIPROCESSOR SYSTEM WITH SPECULATIVE EXECUTION"; U.S. patent application Ser. No. 12/984,329 filed Jan. 4, 2011, for "PHYSICAL ALIASING FOR THREAD LEVEL SPECULATION WITH A SPECULATION BLIND CACHE"; 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 13/004,005, filed Jan. 10, 2011, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 12/696,746, filed on Jan. 29, 2010, for "TWO DIFFERENT PREFETCH COMPLEMENTARY ENGINES OPERATING SIMULTANEOUSLY"; U.S. patent application Ser. No. 12/697,015, filed on Jan. 29, 2010, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, filed Mar. 19, 2010, for "EFFICIENCY OF STATIC CORE TURN-OFF IN A SYSTEM-ON-A-CHIP WITH VARIATION"; U.S. patent application Ser. No. 12/697,043, Jan. 29, 2010, for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, for "ATOMICITY: A MULTI-PRONGED APPROACH"; U.S. patent application Ser. No. 12/697,175, filed Jan. 29, 2010 for "I/O ROUTING IN A MULTIDIMENSIONAL TORUS NETWORK"; U.S. patent application Ser. No. 12/684,287, filed Jan. 8, 2010 for ARBITRATION IN CROSSBAR FOR LOW LATENCY; U.S. patent application Ser. No. 12/684,630, filed Jan. 8, 2010 for "EAGER PROTOCOL ON A CACHE PIPELINE DATAFLOW"; U.S. patent application Ser. No. 12/723,277, filed Mar. 12, 2010 for EMBEDDED GLOBAL BARRIER AND COLLECTIVE IN A TORUS NETWORK; U.S. patent application Ser. No. 12/696,764, filed Jan. 29, 2010 for "GLOBAL SYNCHRONIZATION OF PARALLEL PROCESSORS USING CLOCK PULSE WIDTH MODULATION"; U.S. patent application Ser. No. 12/796,411, filed Jun. 8, 2010 for "GENERATION-BASED MEMORY SYNCHRONIZATION IN A MULTIPROCESSOR SYSTEM WITH WEAKLY CON- SISTENT MEMORY ACCESSES"; U.S. patent application Ser. No. 12/796,389, filed Jun. 8, 2010 for BALANCING WORKLOAD IN A MULTIPROCESSOR SYSTEM RESPONSIVE TO PROGRAMMABLE ADJUSTMENTS IN A SYNCRONIZATION INSTRUCTION U.S. patent application Ser. No. 12/696,817, filed Jan. 29, 2010 for HEAP/STACK GUARD PAGES USING A WAKEUP UNIT; U.S. patent application Ser. No. 61/293,603, filed Jan. 8, 2010 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475, filed May 5, 2010 for "REPRODUCIBILITY IN A MULTIPROCESSOR SYSTEM".

FIELD OF THE INVENTION

The present invention generally relates to a method and system for enhancing performance in a computer system, and more particularly, a method and system for enhancing efficiency and performance of processing in a computer system and in a processor with multiple processing threads for use in a massively parallel supercomputer.

BACKGROUND OF THE INVENTION

Modern processors typically include multiple hardware threads, allowing for the concurrent execution of multiple software threads on a single processor. Due to silicon area and power constraints, it is not possible to have each hardware thread be completely independent from other threads. Each hardware thread shares resources with the other threads. For example, execution units (internal to the processor), and memory and IO subsystems (external to the processor), are resources typically shared by each hardware thread. In many programs, at times a thread must wait for an action to occur external to the processor before continuing its program flow. For example, a thread may need to wait for a memory location to be updated by another processor, as in a barrier operation. Typically, for highest speed, the waiting thread would poll the address residing in memory, waiting for the thread to update it. This polling action takes resources away from other competing threads on the processor. In this example, the load/store unit of the processor would be utilized by the polling thread, at the expense of the other threads that share it.

The performance cost is especially high if the polled variable is L1-cached (primary cache), since the frequency of the loop is highest. Similarly, the performance cost is high if, for example, a large number of L1-cached addresses are polled, and thus take L1 space from other threads.

Multiple hardware threads in processors may also apply to high performance computing (HPC) or supercomputer systems and architectures such as IBM® BLUE GENE® parallel computer system, and to a novel massively parallel supercomputer scalable, for example, to 100 petaflops. Massively parallel computing structures (also referred to as "supercomputers") interconnect large numbers of compute nodes, generally, in the form of very regular structures, such as mesh, torus, and tree configurations. The conventional approach for the most cost/effective scalable computers has been to use standard processors configured in uni-processors or symmetric multiprocessor (SMP) configurations, wherein the SMPs are interconnected with a network to support message passing communications. Currently, these supercomputing machines exhibit computing performance achieving 1-3 petaflops.

There is therefore a need to increase application performance by reducing the performance loss of the application, for example, reducing the increased cost of software in a loop, for example, software may be blocked in a spin loop or similar blocking polling loop. Further, there is a need to reduce performance loss, i.e., consuming processor resources, caused by polling and the like to increase overall performance. It would also be desirable to provide a system and method for polling external conditions while minimizing consuming processor resources, and thus increasing overall performance.

SUMMARY OF THE INVENTION

In an aspect of the invention, a method for enhancing performance of a computer includes providing a computer system including a data storage device. The computer system includes a program stored in the data storage device and steps of the program are executed by a processor; processing instructions from the program using the processor; initiating a pause state for a thread in the processor; providing a pin in the processor for initiating a return to an active state from the pause state for the thread; monitoring specified computer resources using a logic circuit being external to the processor, the logic circuit configured to detect a specified condition; detecting the specified condition using the logic circuit; activating the pin that the specified condition is detected using the logic circuit; and preventing the thread from entering the pause state when the pin is activated.

In a related aspect, the resources monitored by the external logic circuit are memory resources. In another related aspect, the method further comprises a plurality of conditions, including: writing to a memory location; receiving an interrupt command, receiving data from an I/O device, and expiration of a timer. The thread may initiate the pause state itself. The method may further comprise configuring the logic circuit to detect the specified condition continuously over a period of time; and polling the specified condition such that the thread and the logic circuit provide a polling loop of the specified condition. The method may further comprise defining an exit condition of the polling loop such that the logic circuit stops detecting the specified condition when the exit condition is met. In a related aspect, the pin in the processor prevents the thread from entering the pause state. The method further comprises arming the pin, and preventing initiating the thread into the pause state by the pin being in an armed state.

In another aspect of the invention, a system for enhancing performance of a computer comprises a computer system including a data storage device. The computer system includes a program stored in the data storage device and steps of the program are executed by a processor. The processor processes instructions from the program. A thread in the processor includes a pause state. A pin in the processor initiates a return to an active state for the thread. A logic circuit is external to the processor, and the logic circuit is configured to detect a specified condition. The pin initiates the return to the active state of the thread when the specified condition is detected using the logic circuit.

In a related aspect, the resources are memory resources. The system may further comprise a plurality of conditions, including: writing to a memory location; receiving an interrupt command, receiving data from an I/O device, and expiration of a timer. Also, the system may further comprise a polling loop for polling the specified condition using the thread and the logic circuit to poll for the specified condition over a period of time. The system may further comprise an exit condition of the polling loop such that the logic circuit stops detecting the specified condition when the exit condition is met.

In another aspect of the invention, a computer program product comprising a computer readable medium having recorded thereon a computer program. A computer system includes a processor for executing the steps of the computer program for enhancing performance of a computer, the program steps comprise: processing instructions from the program using the processor; initiating a pause state in the processor waiting for receiving specified data; initiating a pause state for a thread in the processor; providing a pin in the processor for initiating an active state for the thread, such that the thread changes from the pause state to the active state; monitoring specified computer resources using a logic circuit being external to the processor, the logic circuit configured to detect a specified condition; detecting the specified condition using the logic circuit; activating the pin that the specified condition is detected using the logic circuit; and initiating the active state of the thread using the pin when the pin is activated.

In a related aspect, the resources are memory resources. The computer program product may comprise a plurality of conditions, including: writing to a memory location; receiving an interrupt command, receiving data from an I/O device, and expiration of a timer. The computer program product may include the thread initiating the pause state itself. The computer program product may further comprise configuring the logic circuit to detect the specified condition continuously over a period of time; and polling the specified condition such that the thread and the logic circuit provide a polling loop of the specified condition. The computer program product may further comprise defining an exit condition of the polling loop such that the logic circuit stops detecting the specified condition when the exit condition is met. In a related aspect, the exit condition is a period of time.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 1:
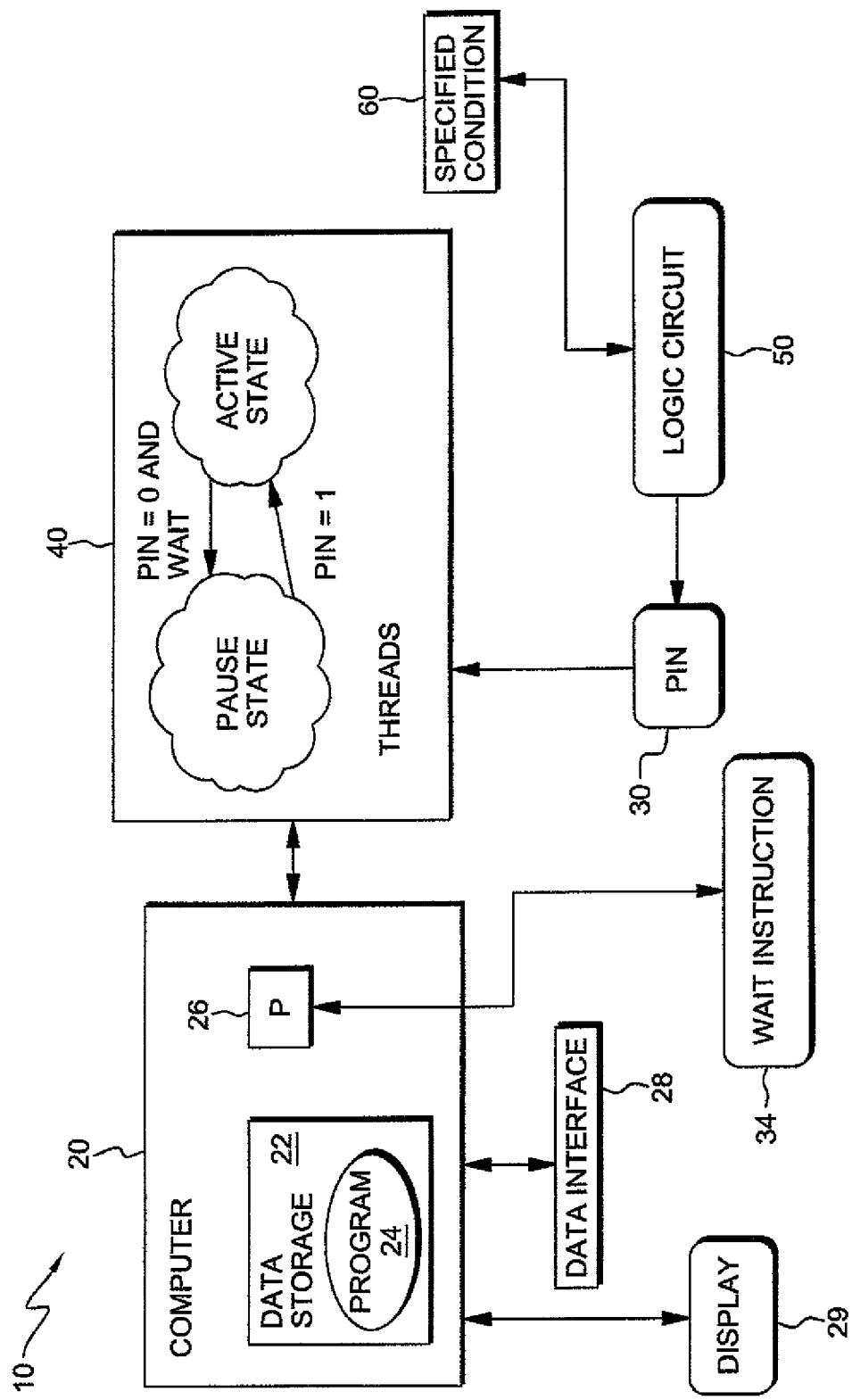
FIG. 1 is a schematic block diagram of a system and method for enhancing performance of a computer according to an embodiment of the invention.

Referring to FIG. 1, a system 10 according to one embodiment of the invention for enhancing performance of a computer includes a computer 20. The computer 20 includes a data storage device 22 and a software program 24 stored in the data storage device 22, for example, on a hard drive, or flash memory. A processor 26 executes the program instructions from the program 24. The computer 20 is also connected to a data interface 28 for entering data and a display 29 for displaying information to a user. The processor 26 initiates a pause state for a thread 40 in the processor 26 for waiting for receiving a specified condition. The specified condition may include detecting specified data, or in an alternative embodiment, a plurality of specified conditions. The thread 40 in the processor 26 is put into pause state while waiting for the specified condition. Thus, the thread 40 does not consume resources needed by other threads in the processor while in pause state. A pin 30 in the processor 26 is configured to initiate the resumption of an active state of the thread 40 from the pause state when the specified condition is detected. A logic circuit 50 is external to the processor 26 and monitors specified computer resources. The logic circuit 50 is configured to detect the specified condition. The logic circuit 50 activates the pin 30 when the specified condition is detected by the logic circuit 50. Upon activation, if the thread is in the pause state, the pin 30 wakes the thread from the pause state, which thereby resumes its active state. If the pin is armed, the thread will not be put into the pause state upon request of a wait instruction by the thread. This ensures that no conditions are lost between the time the thread configures the logic circuit and the time initiates pause mode. For example, if the pin is in an armed state, i.e., the pin is set to return the threads to the active state; the pin prevents transitioning the thread into the pause state, thereby, the thread remains in an active state.

Thereby, the present invention executes the wait instruction 34 (FIG. 1) requesting the pause state for the thread, depending on the value of the pin, the thread is allowed to go to the pause state or not. If the pin is in an armed state then the transition to the pause state is not allowed to occur, and if the pin in not in the armed state then the transition to pause state is granted. Thereby, the above mechanism prevents the thread from consuming resources needed by other threads in the processor until the pin is asserted. The logic circuit external to the processor can then be used to monitor for the action that the thread is waiting for (for example, a write to a certain memory address), and assert the pin, which in turn wakes the thread. Thus, for example, the present invention provides a mechanism for transitioning a polling thread into a pause state, until a pin on the processor is asserted. Thereby, the above mechanism allows the processor to service other threads during the time that the waiting thread's location has not been updated. More generally, the pin may be used to initiate waking of a thread for any action that occurs outside the processor.

Figure 2:
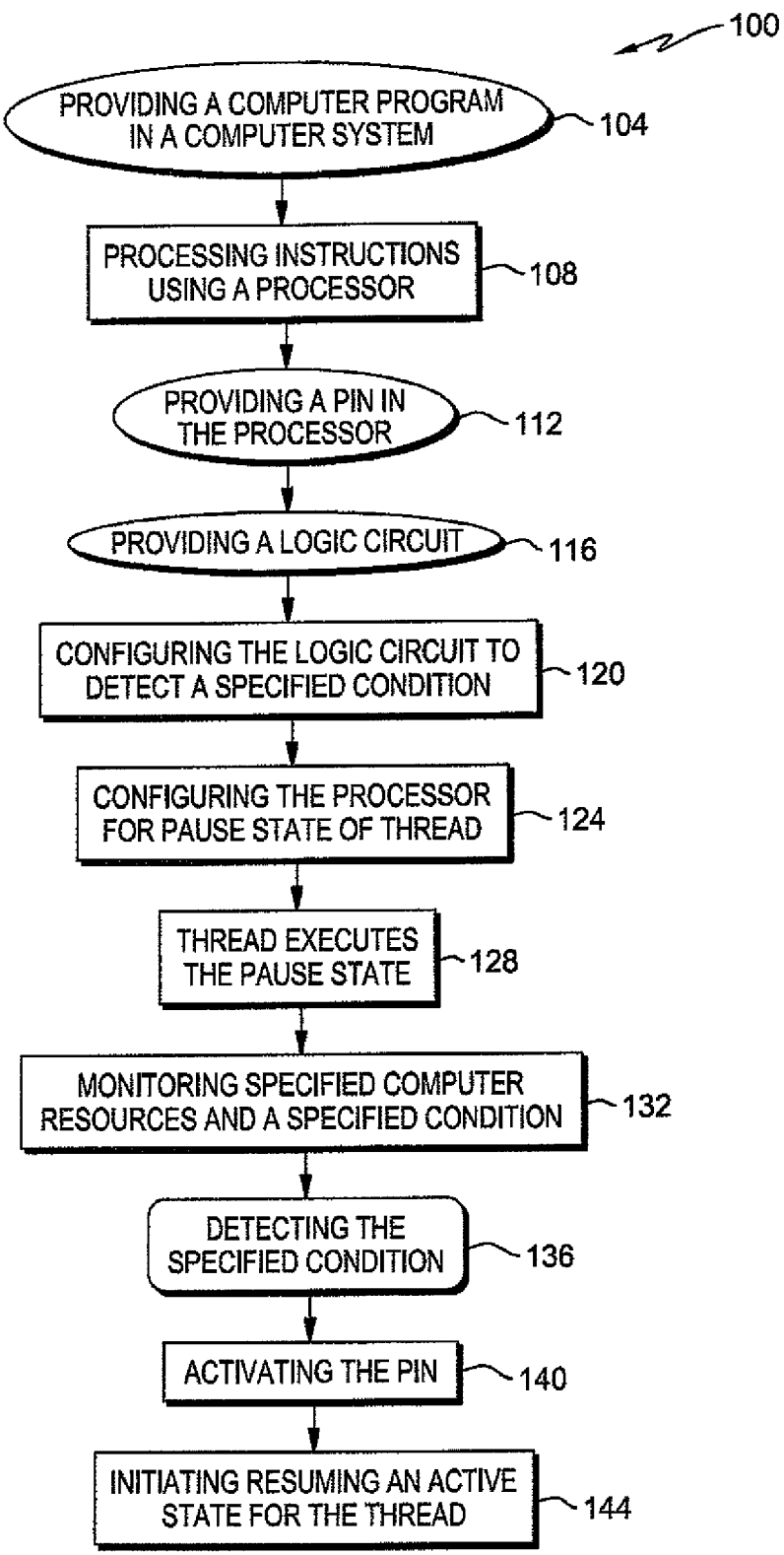
FIG. 2 is a flow chart illustrating a method according to the embodiment of the invention shown in FIG. 1.

Referring to FIG. 2, a method 100 for enhancing performance of a computer system according to an embodiment of the invention includes providing a computer program in a computer system in step 104. The method 100 incorporates the embodiment of the invention shown in FIG. 1 of the system 10. As in the system 10, the computer system 20 includes the computer program 24 stored in the computer system 20 in step 104. A processor 26 in the computer system 20 processes instructions from the program 24 in step 108. The processor is provided with a pin in step 112. A logic circuit 50 is provided in step 116 for monitoring specified computer resources which is external to the processor. The logic circuit 50 is configured to detect a specified condition in step 120 using the processor. The processor is configured for the pin in step 124 such that the thread can be put into a pause state, and returned to an active state by the pin. The thread executes a wait instruction initiating the pause state for the thread in step 128. The logic circuit 50 monitors specified computer resources which includes a specified condition in step 132. The logic circuit 50 detects the specified condition in step 136. The logic circuit 50 activates the pin 30 in step 140 after detecting the specified condition in step 136. The activated pin 30 initiates the active state for the thread 40.

Figure 3:
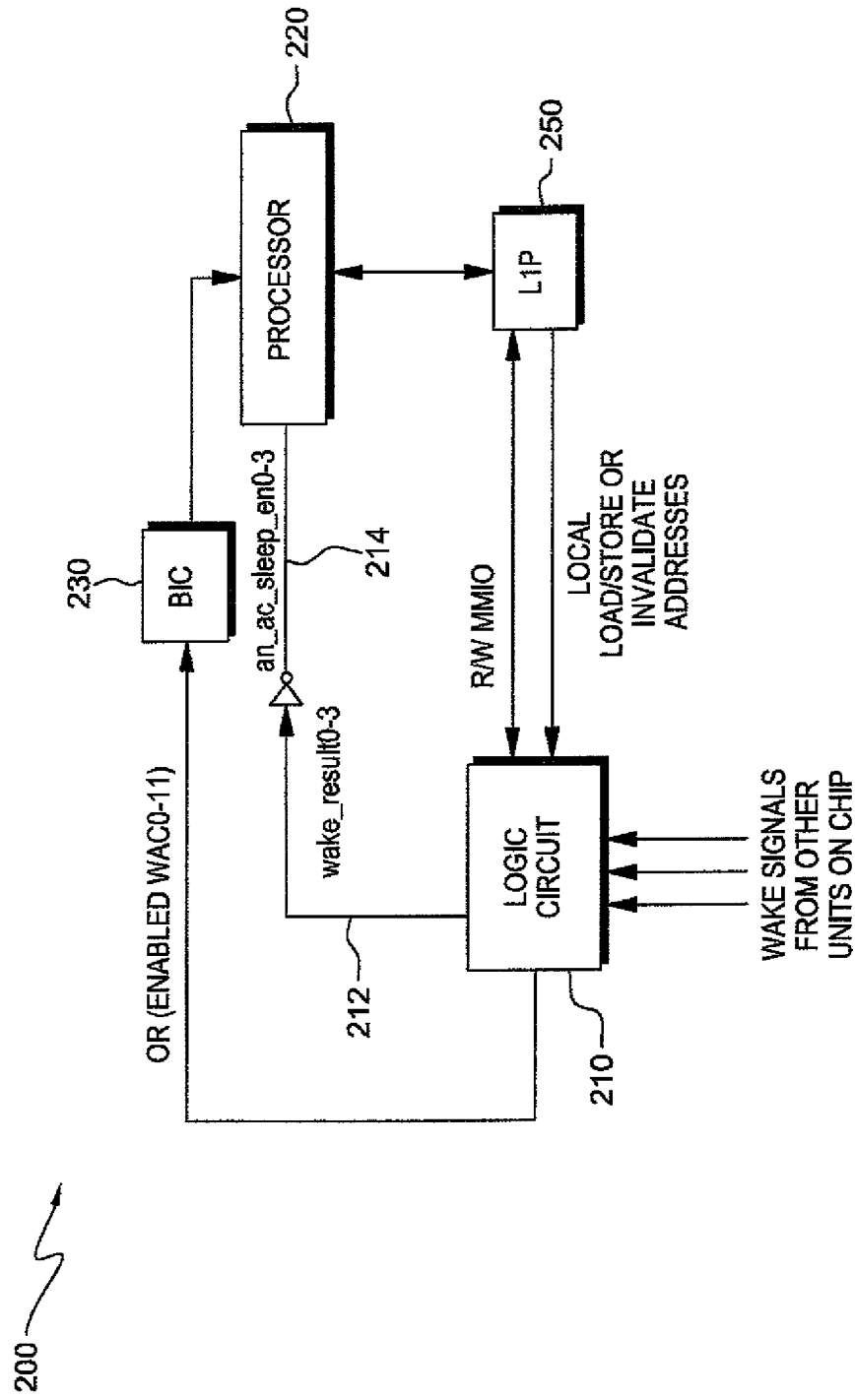
FIG. 3 is a schematic block diagram of a system for enhancing performance of a computer according to an embodiment of the invention.

Referring to FIG. 3, a system 200 according to the present invention, depicts an external logic circuit 210 relationship to a processor 220 and to level-1 cache (L1p unit) 240. The processor includes multiple hardware threads 40. Each processor 220 has a logic circuit unit 110 (one processor 220 is shown as representative of multiple processors). The logic circuit 210 is configured and accessed using memory mapped I/O (MMIO). The system 100 further includes an interrupt controller (BIC) 130, and an L1 prefetcher unit 150.

Thereby, the present invention offloads the monitoring of computing resources, for example memory resources, from the processor to the pin and logic circuit. Instead of having to poll a computing resource, a thread configures the logic circuit with the information that it is waiting for, i.e., the occurrence of a specified condition, and initiates a pause state. The thread in pause state no longer consumes processor resources while it is waiting for the external condition. Subsequently, the pin wakes the thread when the appropriate condition is detected by the logic circuit. A variety of conditions can be monitored according to the present invention, including, but not limited to, writing to memory locations, the occurrence of interrupt conditions, reception of data from I/O devices, and expiration of timers.

The method of the present invention is generally implemented by a computer executing a sequence of program instructions for carrying out the steps of the method and may be embodied in a computer program product comprising media storing the program instructions. Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations.

Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like, as well as a supercomputing environment. The invention may also be practiced in distributed computing environments where tasks are performed by remote processing devices that are linked through a communications network or other data transmission medium. In a distributed computing environment, program modules may be located in both local and remote computer storage media including memory storage devices.

In another embodiment of the invention, the system 10 and method 100 of the present invention may be used in a supercomputer system. The supercomputer system may be expandable to a specified amount of compute racks, each with predetermined compute nodes containing, for example, multiple A2 processor cores. For example, each core may be associated to a quad-wide fused multiply-add SIMD floating point unit, producing 8 double precision operations per cycle, for a total of 128 floating point operations per cycle per compute chip. Cabled as a single system, the multiple racks can be partitioned into smaller systems by programming switch chips, which source and terminate the optical cables between midplanes.

Further, for example, each compute rack may consists of 2 sets of 512 compute nodes. Each set may be packaged around a doubled-sided backplane, or midplane, which supports a five-dimensional torus of size 4×4×4×4×2 which is the communication network for the compute nodes which are packaged on 16 node boards. The tori network can be extended in 4 dimensions through link chips on the node boards, which redrive the signals optically with an architecture limit of 64 to any torus dimension. The signaling rate may be 10 Gb/s, 8/10 encoded), over about 20 meter multi-mode optical cables at 850 nm. As an example, a 96-rack system is connected as a 16×16×16×12×2 torus, with the last ×2 dimension contained wholly on the midplane. For reliability reasons, small torus dimensions of 8 or less may be run as a mesh rather than a torus with minor impact to the aggregate messaging rate. One embodiment of a supercomputer platform contains four kinds of nodes: compute nodes (CN), I/O nodes (ION), login nodes (LN), and service nodes (SN).

An exemplary system for implementing the invention includes a computer with components of the computer which may include, but are not limited to, a processing unit, a system memory, and a system bus that couples various system components including the system memory to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer may include a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer.

System memory may include computer storage media in the form of volatile and/or nonvolatile memory such as read only memory (ROM) and random access memory (RAM). A basic input/output system (BIOS), containing the basic routines that help to transfer information between elements within computer, such as during start-up, is typically stored in ROM. RAM typically contains data and/or program modules that are immediately accessible to and/or presently being operated on by processing unit. The computer may also include other removable/non-removable, volatile/nonvolatile computer storage media.

A computer may also operate in a networked environment using logical connections to one or more remote computers, such as a remote computer. The remote computer may be a personal computer, a server, a router, a network PC, a peer device or other common network node, and typically includes many or all of the elements described above relative to the computer. The present invention may apply to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

In an embodiment of the invention, the processor core allows a thread to put itself or another thread to into a pause state. A thread in kernel mode puts itself into a pause state using a wait instruction or an equivalent instruction. A paused thread can be woken by a falling edge on an input signal into the processor 220 core 222. Each thread 0-3 has its own corresponding input signal. In order to ensure that a falling edge is not "lost", a thread can only be put into a pause state if its input is high. A thread can only be put into a paused state by instruction execution on the core or presumably by low-level configuration ring access. The logic circuit wakes a thread. The processor 220 cores 222 wake up a paused thread to handle enabled interrupts. After interrupt handling completes, the thread will go back into a paused state, unless the subsequent pause state is overriden by the handler. Thus, interrupts are transparently handled. The logic circuit allows a thread to wake any other thread, which can be kernel configured such that a user thread can or cannot wake a kernel thread.

The logic circuit may drive the signals such that a thread of the processor 220 will wake on a rising edge. Thus, throughout the logic circuit, a rising edge or value 1 indicates wake-up. The logic circuit may support 32 wake sources. The wake sources may comprise 12 WakeUp address compare (WAC) units, 4 wake signals from the message unit (MU), 8 wake signals from the BIC's core-to-core (c2c) signaling, 4 wake signals are GEA outputs 12-15, and 4 so-called convenience bits. These 4 bits are for software convenience and have no incoming signal. The other 28 sources can wake one or more threads. Software determines which sources wake corresponding threads.

In an embodiment of the invention, the thread pausing instruction sequence, includes:

1. Software setting bits to enable the allowed wakeup options for a thread. Enabling specific exceptions to interrupt the paused thread and resume execution. Each thread has a set of Wake Control bits which determine how the corresponding thread can be started after a pause state has been entered.

In an alternative embodiment of the invention, a pause unit can serve multiple threads. The multiple threads may or may not be within a single processor core. This allows address-compare units and other resume condition hardware to be shared by multiple threads. Further, the threads in the present invention may include barrier, and ticket locks threads.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for enhancing performance of a computer, comprising:
    providing a computer system including a data storage device, the computer system including a program stored in the data storage device and steps of the program being executed by a processer;
    processing instructions from the program using the processor;
    initiating a pause state for a thread in the processor;
    providing a physical pin in the processor for initiating a return to an active state from the pause state for the thread;
    monitoring specified computer resources using a logic circuit being external to the processor, the logic circuit configured to detect a specified condition;
    detecting the specified condition using the logic circuit;
    using the logic circuit to logically assert the pin when the specified condition is detected using the logic circuit; and
    initiating the active state of the thread when the logic circuit logically asserts the pin;
    wherein the method further comprises:
    configuring the logic circuit to detect the specified condition continuously over a period of time;
    polling the specified condition such that the thread and the logic circuit provide a polling loop of the specified condition; and
    defining an exit condition of the polling loop such that the logic circuit stops detecting the specified condition when the exit condition is met;
    wherein the exit condition is a period of time.

2. The method of claim 1, wherein the resources monitored by the external logic circuit are memory resources.

3. The method of claim 1, wherein:
    the specified condition is selected from a plurality of conditions, including: writing to a memory location; receiving an interrupt command, receiving data from an I/O device, and expiration of a timer.

4. The method of claim 1, wherein the thread initiates the pause state itself.

5. The method of claim 1, further comprising:
    arming the pin; and
    preventing initiating the thread into the pause state by the pin being in an armed state.

6. A system for enhancing performance of a computer, comprising:
    a computer system including a data storage device, the computer system including a program stored in the data storage device and steps of the program being executed by a processer, the processor processing instructions from the program;
    a physical pin in the processor for initiating a return of a thread in the processor to an active state from a pause state, wherein the pause state is when the thread in the processor is waiting for receiving specified data; and a logic circuit being external to the processor, the logic circuit being configured to detect a specified condition, and the logic circuit being configured to logically assert the pin when the specified condition is detected by the logic circuit, wherein the logical assertion of the pin by the logic circuit initiates the return to the active state of the thread when the specified condition is detected using the logic circuit;

wherein the processor processes instructions from the program for:

configuring the logic circuit to detect the specified condition continuously over a period of time;

polling the specified condition such that the thread and the logic circuit provide a polling loop of the specified condition; and defining an exit condition of the polling loop such that the logic circuit stops detecting the specified condition when the exit condition is met;

wherein the exit condition is a period of time.

7. The system of claim 6, wherein the specified condition relates to one or more memory resources.

8. The system of claim 6, wherein:

the specified condition is selected from a plurality of conditions, including: writing to a memory location; receiving an interrupt command, receiving data from an I/O device, and expiration of a timer.

9. The system of claim 6, wherein the pin includes an armed state, and the pin being in the armed state prevents initiating the thread into the pause state.

10. A computer program product comprising a computer readable medium having recorded thereon a computer program, the computer program operable with a computer system including a processor for executing the steps of the computer program for enhancing performance of a computer, the processor having a physical pin for initiating a return to an active state from a pause state for a thread, the program steps comprising:

processing instructions from the program using the processor;

initiating the pause state for the thread in the processor, wherein the pause state is when the thread in the processor is waiting for receiving specified data;

monitoring specified computer resources using a logic circuit being external to the processor, the logic circuit configured to detect a specified condition;

detecting the specified condition using the logic circuit;

using the logic circuit to logically assert the pin when the specified condition is detected using the logic circuit; and initiating the active state of the thread when the logic circuit logically asserts the pin;

wherein the program steps further comprise:

configuring the logic circuit to detect the specified condition continuously over a period of time;

polling the specified condition such that the thread and the logic circuit provide a polling loop of the specified condition; and defining an exit condition of the polling loop such that the logic circuit stops detecting the specified condition when the exit condition is met;

wherein the exit condition is a period of time.

11. The computer program product of claim 10 wherein the resources are memory resources.

12. The computer program product of claim 10, wherein:

the specified condition is selected from a plurality of conditions, including: writing to a memory location; receiving an interrupt command, receiving data from an I/O device, and expiration of a timer.

13. The computer program product of claim 10, wherein the thread initiates the pause state itself.

* * * * *